United States Patent
Docherty et al.

(10) Patent No.: US 12,267,558 B2
(45) Date of Patent: Apr. 1, 2025

(54) METHOD AND SYSTEM FOR PERSONALIZED CONTENT RECOMMENDATION

(71) Applicant: ThinkAnalytics Ltd., Glasgow (GB)

(72) Inventors: Peter Docherty, Glasgow (GB); Christopher McGuire, Glasgow (GB); Alan Ryman, Glasgow (GB)

(73) Assignee: ThinkAnalytics Ltd., Glasgow (GB)

( * ) Notice: Subject to any disclaimer, the term of this patent is extended or adjusted under 35 U.S.C. 154(b) by 0 days.

(21) Appl. No.: 18/129,732

(22) Filed: Mar. 31, 2023

(65) Prior Publication Data

US 2024/0334014 A1 Oct. 3, 2024

(51) Int. Cl.
*H04N 21/466* (2011.01)

(52) U.S. Cl.
CPC ..... *H04N 21/4668* (2013.01); *H04N 21/4667* (2013.01)

(58) Field of Classification Search
CPC . H04N 21/4668; H04N 21/4667; G06F 17/30
See application file for complete search history.

(56) References Cited

U.S. PATENT DOCUMENTS

| | | |
|---|---|---|
| 6,567,814 B1 | 5/2003 | Bankier et al. |
| 7,805,129 B1 | 9/2010 | Issa et al. |
| 9,699,491 B1 | 7/2017 | Docherty et al. |
| 9,756,390 B1 | 9/2017 | Docherty et al. |
| 9,906,837 B1 | 2/2018 | Docherty et al. |
| 9,973,797 B1 | 5/2018 | Docherty et al. |
| 10,091,555 B1 | 10/2018 | Docherty et al. |
| 10,289,739 B1 | 5/2019 | Docherty et al. |
| 10,356,035 B1 | 7/2019 | Gravino et al. |
| 10,412,454 B2 | 9/2019 | Docherty et al. |
| 11,212,584 B2 | 12/2021 | Docherty et al. |
| 11,343,573 B2 | 5/2022 | Docherty et al. |
| 2003/0106064 A1 | 6/2003 | Plourde |
| 2006/0123448 A1* | 6/2006 | Ma .................. H04N 5/445 |
| 2007/0157222 A1 | 7/2007 | Cordray et al. |
| 2008/0304812 A1 | 12/2008 | Jin |
| 2010/0005492 A1 | 1/2010 | Takano et al. |
| 2010/0070507 A1 | 3/2010 | Mori |
| 2011/0243529 A1 | 10/2011 | Oryoji et al. |
| 2013/0086082 A1* | 4/2013 | Park .................. G06F 17/30 |
| 2014/0149344 A1 | 5/2014 | Pudipeddi et al. |

(Continued)

FOREIGN PATENT DOCUMENTS

| | | |
|---|---|---|
| EP | 1 317 143 A1 | 6/2003 |
| EP | 2 207 348 A2 | 7/2010 |

(Continued)

*Primary Examiner* — Anthony Bantamoi
(74) *Attorney, Agent, or Firm* — Foley & Lardner LLP

(57) ABSTRACT

A method and system for providing, to a user device configured for providing content to a user, one or more personalized content item recommendations. The method comprising: retrieving a seed content item identifier from user data stored in a user profile; using the seed content item identifier to generate a plurality of initial content item recommendations; sorting the plurality of initial content item recommendations based on the user profile; and providing one or more of the sorted content item recommendations as personalized content item recommendations to the user device.

16 Claims, 7 Drawing Sheets

(56) References Cited

U.S. PATENT DOCUMENTS

| | | |
|---|---|---|
| 2014/0279756 A1 | 9/2014 | Whitman |
| 2015/0082330 A1 | 3/2015 | Yun et al. |
| 2015/0100987 A1 | 4/2015 | Whitman et al. |
| 2015/0269488 A1 | 9/2015 | Galai et al. |
| 2016/0162503 A1* | 6/2016 | Yan .................. G06F 17/30 |
| 2017/0311015 A1 | 10/2017 | Docherty et al. |
| 2020/0252690 A1 | 8/2020 | Docherty et al. |

FOREIGN PATENT DOCUMENTS

| | | |
|---|---|---|
| GB | 2 574 581 A | 12/2019 |
| WO | WO-01/15449 A1 | 3/2001 |
| WO | WO-02/27526 A1 | 4/2002 |
| WO | WO-2008/042242 A2 | 4/2008 |
| WO | WO-2013/130834 A1 | 9/2013 |
| WO | WO-2013/186061 A1 | 12/2013 |

\* cited by examiner

Table 1 – CRE learning tables

| Section Number | DB Table name |
|---|---|
| Subscriber Timeslot Learning tables | |
| 10.1 | re_sub_ts_learned_language |
| 10.4 | re_sub_ts_content_item_ratings |
| 10.5 | re_sub_ts_feature_ratings |
| 10.6 | re_sub_ts_watched_episodes |
| | |
| Customer Learning tables: | |
| 7.1 | re_customer_learned_language |
| 7.4 | re_content_item_ratings |
| 7.5 | re_feature_ratings |
| 7.6 | re_customer_watched_episodes |
| | |
| Session Learning tables | |
| 12.1 | re_session_learned_language |
| 12.4 | re_session_content_item_ratings |
| 12.5 | re_session_feature_ratings |
| 12.6 | re_session_watched_episodes |
| | |
| Cookie Learning tables | |
| 14.1 | re_cookie_learned_language |
| 14.4 | re_cookie_content_item_ratings |
| 14.5 | re_cookie_feature_ratings |
| 14.6 | re_cookie_watched_episodes |
| | |
| Subscriber Combined Learning tables | |
| 9.1 | re_sub_learned_language |
| 9.4 | re_sub_content_item_ratings |
| 9.5 | re_sub_feature_ratings |
| 9.6 | re_sub_watched_episodes |

Figure 2

METHOD AND SYSTEM FOR PERSONALIZED CONTENT RECOMMENDATION

FIELD OF THE INVENTION

The present invention relates to a method and system for providing, to a user device configured for providing content to a user, one or more personalized content item recommendations.

BACKGROUND OF THE INVENTION

Developments in technology, for example, the advent of digital television, internet enabled video-on-demand services and the availability of personal video recorders has led to consumers altering their viewing habits including how, where and when they consume video and other content. Furthermore, the amount of content that is available via many systems has expanded enormously.

In this context, during a viewing session, a viewer is faced with a very large choice of what to watch from a wide range of available content sources. Faced with such a large choice a viewer may view or otherwise consume content they are already familiar with rather than try something new.

The large choice of content and the increased variety of content sources has led to various technical developments to enable users to better access and select content, for example developments to electronic program guides (EPGs). It is also known for viewers to filter the large choice of content using a search function. However, both approaches can result in viewers continuing to view content with which they are already familiar. Ultimately, this can lead viewers to become dissatisfied as they may feel they are not exploiting the system and range of content to the full. It can be frustrating and time consuming for a user to seek out suitable new content available from the wide range of choices available from TV and other content service providers. It has been suggested to provide viewers with content recommendations, which may lead them more rapidly to content that may be of interest.

Personal video recorders have the capability of recording and storing content items from live linear television broadcasts and downloading and storing content items from video on demand services. As such, the content items stored on such devices provide a content source that is unique to the owner of the personal video recorder.

SUMMARY

In a first aspect of the invention, there is provided a computer-implemented method for providing, to a user device configured for providing content to a user, one or more personalized content item recommendations, comprising:
  retrieving a seed content item identifier from user data stored in a user profile;
  using the seed content item identifier to generate a plurality of initial content item recommendations;
  sorting the plurality of initial content item recommendations based on the user profile; and
  providing one or more of the sorted content item recommendations as personalized content item recommendations to the user device.

The user data may comprises content item identifiers for content flagged as a result of a user action and the seed content item identifier may be selected from said content item identifiers.

The sorting the plurality of initial content item recommendations based on the user profile may comprises:
  obtaining metadata representing at least some properties of content associated with the content item identifiers in the user profile;
  comparing the metadata from the user profile with metadata associated with the initial content item recommendations; and
  ordering the initial content item recommendations from most closely matching to least closely matching.

The metadata may comprise a weighting of an importance of each property in relation to the content.

The method may further comprise filtering the one or more personalized content item recommendations based on popularity, prior to providing the one or more personalized content item recommendations to the user device.

The method may further comprise filtering the initial content item recommendations based on popularity, prior to sorting the plurality of initial content item recommendations.

The user action may comprise one or more of: selecting, viewing, recording, purchasing, reading, listening to, playing, sharing, content rating, commenting on, downloading, watching, bookmarking, browsing, adding to a shopping basket, watching or listening to a trailer, clicking on a search result, remotely recording, setting a reminder, liking, disliking, tweeting, posting on social media, playing purchased content, stopping watching, stopping playing or otherwise interacting with content.

The metadata may comprise data relating to one or more of: actor; audience; award; category; character; character type; concept source; director; format; franchise; host; milieu; mood; producer; person; singer; subcategory; scenario; setting; sports competition; studio; style; subject; team; theme; time period; and writer.

The using the seed content item identifier to generate a plurality of initial content item recommendations may comprises:
  obtaining metadata associated with a seed content item identified by the seed content item identifier; and
  identifying related content comprising content associated with one or more of the same or similar metadata.

The using the seed content item identifier to generate a plurality of initial content item recommendations may comprise:
  identifying other users that have viewed the seed content item identified by the seed content item identifier; and
  identifying collaborative content comprising content viewed by said other users.

The providing one or more of the personalized content item recommendations to the user device may comprise instructing the user device to display the one or more personalized content item recommendations for selection by the user.

The method may further comprise monitoring user activity including identifying content that the user of the user device has interacted with and adding content item identifiers, for the identified content, to the user data.

The method may further comprise selecting the seed content item identifier based on one or more of: a recency of a user action associated with a content item identifier in the user profile; a time of day of a user action associated with a content item identifier in the user profile; a day of a week of a user action associated with a content item identifier in the user profile; a number of user actions associated with a same content item identifier in the user profile; a number of user actions associated with similar or related content item identifiers in the user profile; a type of user action associated with a content item identifier in the user profile; and a popularity among a group of users, of a content item identifier in the user profile.

The content may comprise one or more of: television content; video content, audio content, visual content, computer games, printed content, text-based content, live performances, movies, TV programs, music, podcasts, talking books, computer games, books, magazines, news, recipes, concerts, plays, comedy performances, entertainment or sporting events.

The user profile may be stored in a first memory resource remote from the user device, the first memory resource storing user profiles for a plurality of users of a content distribution system; and the content may be stored in a second memory resource remote from the first memory resource, the second memory resource storing items of content for the content distribution system.

In a second aspect of the invention, there is provided a system for providing, to a user device configured for providing content to a user, one or more personalized content item recommendations, the system comprising processing circuitry configured to:
  retrieve a seed content item identifier from user data stored in a user profile;
  use the seed content item identifier to generate a plurality of initial content item recommendations;
  sort the plurality of initial content item recommendations based on the user profile; and
  provide one or more of the sorted content item recommendations as personalized content item recommendations to the user device.

In a third aspect of the invention, there is provided a non-transitory computer-readable medium that comprises computer-readable instructions that are executable to perform a method for providing, to a user device configured for providing content to a user, one or more personalized content item recommendations, comprising:
  retrieving a seed content item identifier from user data stored in a user profile;
  using the seed content item identifier to generate a plurality of initial content item recommendations;
  sorting the plurality of initial content item recommendations based on the user profile; and
  providing one or more of the sorted content item recommendations as personalized content item recommendations to the user device.

The content may be provided by a content distribution system (or content provider system) may comprise at least one of a TV distribution system, a TV subscription service, a video-streaming system, a Video-on-Demand system.

The content distribution system has a plurality of users and may comprise at least 10,000 user devices, optionally at least 100,000 user devices, optionally at least 1,000,000 user devices.

The plurality of user devices may comprise at least one of a set top box, a television, a mobile device, a smartphone, a computer, a tablet, a game console or other device.

Reference to a user may include reference to a subscriber. A subscriber may have a plurality of users associated with it. For example, a subscription may be associated with a household and there may be a plurality of users, for example family members, associated with the subscription and who may, for example, interact with content.

The method may further comprise storing the recommended content in a database and/or outputting the recommended content via at least one of: a batch process, at least one e-mail, at least one short message service (SMS) message.

The method may comprise opening a content recommendation session prior to retrieving the seed content item identifier from user data stored in the user profile.

The method may comprise retrieving user data for a plurality of users from a first storage resource, storing the user data in a second storage resource, and maintaining the user data in the first and/or second storage resource during the content recommendation session.

The method may comprise using the user data from the second storage resource and content information from one or more content sources to generate at least one desired content recommendation during the content recommendation session and providing the at least one desired content recommendation.

The providing of the at least one content recommendation may comprise providing the at least one content recommendation to an operator device of the content distribution system or to the user device, either directly or indirectly. The at least one content recommendation may be provided to a further device, database and/or system that may process and/or send the at least one content recommendation to the user device.

The first storage resource may comprise at least one of a remote storage resource and a less rapidly readable storage resource, and/or the second storage resource may comprise at least one of a local storage resource and a more rapidly readable storage resource.

The first storage resource may comprise a hard disk storage resource and the second storage resource may comprise random access memory (RAM).

The user data, for each user, may be stored in the first storage resource at substantially contiguous physical storage locations.

Storing the user data, for each user, at substantially contiguous physical locations may comprise storing the user data in a single sector of the first storage resource, or in a plurality of substantially contiguous sectors of the first storage resource.

The user data may be updated in one or more of the first storage resource and the second storage resource during the content recommendation session. For example, the user data in the second storage resource may represent a snapshot of the user data in the first storage resource at a beginning of the content recommendation session.

In some cases, the user data may be maintained in parallel in both the first and second storage resources, for example both in a hard disk resource in RAM.

The updating of the user data in the second storage resource may be performed in response to each new relevant user action, and the updating of the user data in the first storage resource may be performed at least one of:
  a) in response to an expiry of the content recommendation session;
  b) periodically;
  c) in response to at least one of processing capacity or communication capacity being available.

The updating of the user data in the first storage resource may comprise copying of at least some of the data from the second storage resource to the first storage resource.

The updating of the user data in the first storage resource and the updating of the user data in the second storage resource may be both performed in response to each new relevant user action.

The updating of the user data for each user in the first storage resource may comprise storing the updated user data for the each user at substantially contiguous physical locations at the first storage resource.

The updated user data for each user may comprise new user data and pre-existing user data, and the storing of the updated user data for each user may comprise storing the new user data in the first storage resource at physical locations substantially contiguous with physical locations at which the pre-existing user data for each user is stored.

The pre-existing user data for each user may comprise user data for each user that was already stored in the first storage resource at the start of the content recommendation session.

The method may comprise deleting the user data for each user from the second storage resource in response to at least one of: expiry of the content recommendation session; the second storage resource being full or exceeding a threshold storage limit. The user data may comprise user preference data based at least in part on user activity and, optionally, on at least one user preference selection by the user.

The user data may comprise at least one of: user action data representing previous user actions, optionally content selection, viewing or recording actions, user language data and/or episode data; content metadata representing properties of content viewed, recorded or selected by a user.

Features in one aspect may be provided as features in another aspect. For example, method features may be provided as apparatus features and vice versa.

BRIEF DESCRIPTION OF THE DRAWINGS

Various aspects of the invention will now be described by way of example only, and with reference to the accompanying drawings, of which:

FIG. 2 is a representation of certain database learning tables used by the system of FIG. 1;

DETAILED DESCRIPTION

In TV systems, or other systems for provision of content to a user, each service provider may have thousands, tens or hundreds of thousands, or millions of customers, wherein each customer is unique and may have different viewing habits and preferences. It has therefore been recognized that each customer may require different content.

Tracking, recording and processing large volumes of customer data and large amounts of content data in order to determine what content may be popular, taking into account the time constraints demanded by a viewer and by the system poses a significant technical challenge. The time constraints demanded by particular content providers, or expected by users, for provision of content may be particularly demanding, with, for example, content recommendations being required to be generated almost instantaneously, for example within a few hundred milliseconds of a user switching on a set top box or otherwise beginning a viewing session. This can present a significant technical challenge, particularly as the content recommendation system is usually hosted on a server remote from the set top box and, for systems with millions of subscribers, may have to deal simultaneously with hundreds of thousands of user actions and recommendations per minute during busy periods.

An ability to maintain anonymity of the users (e.g. to avoid issues in connection with the General Data Protection Regulation (GDPR) or similar) when providing determinations or recommendations and taking other actions, may be important in some embodiments. The content provider system and/or the digital content recommendation system described herein may be configured so as to restrict or not allow access to personal information, or data that could be used to determine the name of a user, or demographic information concerning the user.

Figure 1:
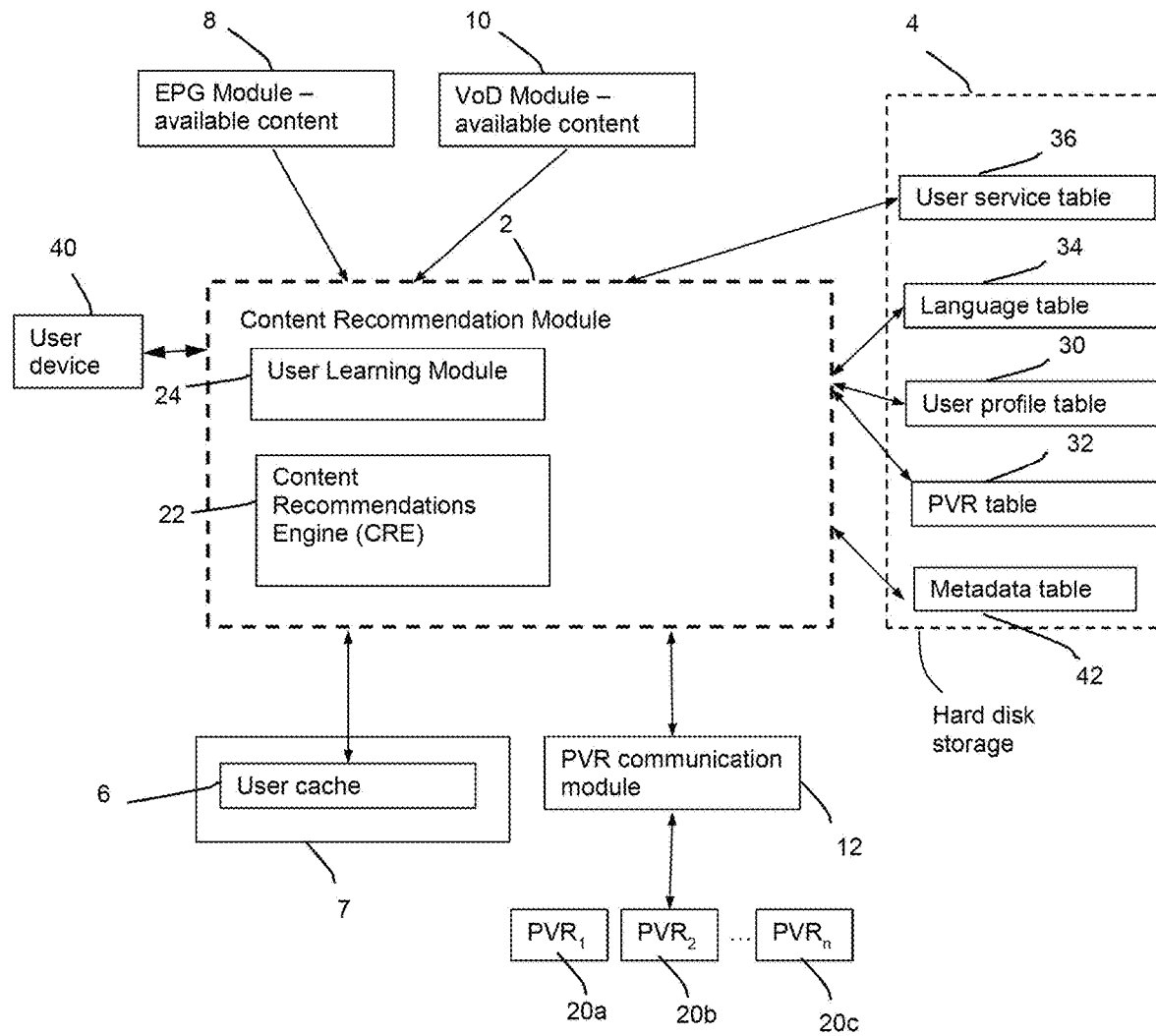
FIG. 1 is a schematic diagram of a digital content recommendation system.

The system of FIG. 1 is able to provide content recommendations may be provided in real time or near real time for many thousands, tens of thousands or even hundreds of thousands or more users, for example using techniques as described in UK Patent No. GB 2574581 or U.S. Pat. No. 11,343,573, the content of each of which is incorporated herein by reference.

FIG. 1 shows a schematic diagram of a digital content recommendation system according to an embodiment. The system is able to recommend content in a timely manner, based on real time or near real time monitoring of user actions for many thousands, tens of thousands or even hundreds of thousands or more users.

Example modes of operation are described below but recommended content may be determined in respect of any suitable users or user accounts, with the recommended content accessible via any suitable devices, for example set-top boxes, smartphones, personal computers (PCs) or tablets or any other suitable content delivery mechanism.

The system comprises a content recommendation module 2 linked to a first storage resource in the form of a hard disk storage device 4, which is used to store various user data. The content recommendation module 2 is also communicatively linked to a second storage resource in the form of a local storage device that includes at least one cache, for example a user cache 6. In the embodiment of FIG. 1 the local storage device is in the form of RAM 7 but any suitable storage device may be used in alternative embodiments. The user cache 6 may be used for temporary storage of user data obtained from the hard disk storage device 4 during a content recommendation session, as discussed in more detail below.

In the embodiment of FIG. 1, the content recommendation module 2 comprises a user learning module 24 and a content recommendation engine (CRE) 22.

The user learning module 24 is configured to monitor user activity including identifying content that the user of a user device 40 has interacted with, for each of the plurality of user devices 40. Optionally, the user learning module 24 may obtain metadata concerning the identified items of content, the metadata representing at least some properties of the identified items of content.

The content recommendation engine (CRE) 22 is configured for retrieving a seed content item identifier from user data stored in a user profile; using the seed content item identifier to generate a plurality of initial content item recommendations; sorting the plurality of initial content item recommendations based on the user profile; and providing one or more of the sorted content item recommendations as personalized content item recommendations to the user device.

As discussed further below, the content recommendation module 2 is able to communicate, either directly or indirectly, and either via wired or wireless connection, with very large numbers of users via user devices 40 and to provide recommendations for content derived from such users or user devices 40. Other than some personal video recorders (PVRs) which are shown schematically in FIG. 1, multiple user devices 40 are not shown in FIG. 1 for clarity. However, it will be understood that although a number n of PVRs (20a, 20b, 20c) are shown communicatively connected to the content recommendation module 2 via a PVR communication module 12, the PVRs may constitute or be comprised within user devices 40.

The content recommendation module 2 is also linked to sources of information concerning available content, in this case an EPG module 8 and a Video-on-Demand (VoD) module which provide information concerning content available to a user via an EPG (for example, scheduled TV programs on a set of channels) and via a VoD service. In alternative embodiments, a variety of other sources of content may be available as well as, or in addition to, EPG and VoD content, for example internet content and/or any suitable streamed content via wired or wireless connection.

In the embodiment of FIG. 1, the EPG module 8, the VOD module 10, the content recommendation module 2, the user cache 6, the PVR communication module 12, the CRE 22 and the user learning module 24 are implemented in a server. The server includes communication circuitry that enables communication between the server, or appropriate components of the server with each of the user devices, and with the content sources, for example a TV service operator or other content service operator.

Any other suitable implementation of the EPG module 8, the VOD module 10, content recommendation module 2, the user cache 6, the PVR communication module 12, the CRE 22 and the user learning module 24 may be provided in alternative embodiments, for example they may be implemented in any software, hardware or any suitable combination or software and hardware. Furthermore, in alternative embodiments any one of the components as described in relation to the embodiment of FIG. 1 or other embodiments may be combined with any other one(s) of the components, or any one of the components may be split into multiple components providing the same or similar functionality.

The EPG module 8 and the VoD module 10 obtain information concerning available content from the content sources, for example a TV service operator or other content service operator. The content information comprises metadata of content, for example, television program metadata. The metadata may be representative of a variety of different content parameters or properties, for example but not limited to program title, time, duration, content type, program categorization, actor names, genre, release date, episode number, series number. It is a feature of the embodiment that the metadata stored at the EPG module 8 and the VOD module 10 may also be enriched with additional metadata, for example by the operator of the content recommendation system, such that additional metadata to that provided by the content sources or other external sources may be stored.

In the embodiment of FIG. 1 the content recommendation server, in particular the content recommendation module 2, communicates directly with each of the user devices 40, for example to monitor user activity, to identify content that the user of a user device 40 has interacted with, and to store user data relating to the identified content in the hard disk storage device 4. In some embodiments, the content recommendation module 2 communicates with the user devices 40 via the content sources or via other servers or devices. For example, in such other embodiments, user activity data may be sent to the content recommendation server via one of the content source servers or other server or device.

In the embodiment of FIG. 1 the system operates together with three sources of content available for a user device: real-time linear television, for example terrestrial or satellite broadcast television; one or more video-on-demand (VOD) services, and pre-recorded video content stored on one or more personal video recorders (PVR). In other embodiments further sources of content as well as or instead of the above may be used. The available content sources may be provided to the user devices 40 from a content provider.

The operation of the digital content recommendation system is controlled by the content recommendation module 2. As can be seen in FIG. 1, the content recommendation module 2 is configured to communicate with the one or more content information modules: the electronic program guide (EPG) module and VoD module 10. The content recommendation module 2 is also configured to communicate with the user cache 6 local to the content recommendation module 2, the hard disk storage resource 4 and the one or more PVRs. A data access layer provides a communication interface between the content recommendation module 2 and the hard disk storage resource 4. The personal video recorder (PVR) communication module 12 provides a communication interface between the one or more PVRs 20a, 20b, . . . 20z and the content recommendation module 2.

The content recommendation module 2 has a content recommendation engine (CRE) 22 and a user learning module 24. The CRE 22 applies a set of processes to determine, in real time, content recommendations for a user based on user data and available content. The user learning module 24 receives data indicative of selections or other actions by a user and builds up a set of user data, for example comprising or representing a user history or profile, which is stored in the hard disk storage 4, and which is used in generating personalized recommendations for the user. Operation of the CRE 22 and the user learning module 24 is discussed in more detail below.

In relation to FIG. 1, a request for recommendation for the user may be received by the content recommendation module 2. A user action carried out on the user device 40 may also be received by the content recommendation module 2. In addition to receiving requests for recommendation, the content recommendation module 2 is configured to log user activity. By logging user activity and storing activity over an extended period of time, the content recommendation module 2 and the hard disk storage 4 can build up an overall picture of the viewing activities, habits and preferences of a plurality of users. User actions are turned into learn actions by the user learning module 24 to be processed by the content recommendation engine 22.

The system of FIG. 1 is configured to operate with a plurality of user devices 40 each associated with at least one user. The plurality of user devices 40 may comprise a large number of devices, for example thousands, tens or hundreds of thousands, or even millions of devices. Each user device 40 may be any device or combination of devices that is configured to enable a user to view or otherwise consume content. For example, each user device 40 may be an internet-enabled device and/or a device for providing video or other content on demand and/or a device capable of receiving a real-time linear television broadcast signal. The user device 40 may be a mobile device, for example a tablet, a smart phone or a laptop. Alternatively, the user device 40 may not be mobile, for example, an internet browser enabled computing device, a smart television or a set-top box. The user device 40 may also have an in-built or associated PVR for recording and storing content in some embodiments.

The user may be a viewer of the user device 40. Alternatively or additionally, the user may be a subscriber and/or customer of a service accessible through the user device 40.

The user device 40 is communicatively coupled to the content recommendation module 2. The content recommendation module 2 has an application programming interface (the recommendation engine API) that provides a set of rules for monitoring user activity and carrying out a content recommendation procedure.

The user cache 6 is coupled to the content recommendation module 2 and is configured to store data for the content recommendation procedure. The content recommendation module 2 can access data stored on the user cache 6. The user cache 6 may be provided in random access memory (RAM) 7.

The hard disk storage 4 is communicatively coupled to the content recommendation module 2. The hard disk storage 4 stores data for use by the content recommendation module 2. The hard disk storage 4 is configured to store one or more databases. Entries from the databases on the hard disk storage resource 4 can be retrieved by the content recommendation module 2 via requests made through the data access layer. Entries in the databases may also be updated via the data access layer.

The database(s) at the hard disk storage 4 store user data that is used by the content recommendation module 2 to determine content recommendations. In the embodiment of FIG. 1 a set of database tables is provided that store information concerning the users.

In the embodiment of FIG. 1, the tables may include at least one user service table 36 that represents user service requirements, and at least one user profile table 30 that includes user attribute data that may be considered to represent a user profile. A user profile may include, for example, the following attributes: unique identifiers, for example a user identifier, a subscriber identifier, an anonymous session identifier; one or more unique geographic identifiers; a flag indicating whether or not the user has a PVR; a flag indicating whether or not the user is in debt; a flag indicating whether or not the user has opted out of receiving marketing material; one or more codes indicating one or more preferred languages of the user; a flag indicating if the user has opted out of receiving personal recommendations; the age of the user; the name of the user and the gender of the user.

In the embodiment of FIG. 1, the tables, for example, the user profile table 30, may include various user learning tables that include data representing for example the viewing activities, habits and preferences of each user. The user data can include data representing for examples explicit ratings given by a user to a particular program or other item of content. It is a feature of the embodiment of FIG. 1 that the user data also includes data representing actions, for instance viewing actions, taken by a user.

For example, if a user selects a program or other item of content and views or otherwise consumes it for greater than a threshold period of time then a learn action is generated and at least one user data item for that user is stored in at least one of the tables. The data item may include various data including for example start and stop viewing time, time slot identifier, program identifier, at least some metadata concerning the program (which may be stored in metadata table 42, although such metadata may be stored separately as content data rather than user data in some embodiments, and linked to or otherwise accessed if required, for example by the program name or other identifier). The user learning module 24 determines whether user data should be stored in the tables in respect of a particular user action or set of actions. For example, if a user only views a program for a very short period of time, for instance if they are channel surfing, then user data is not stored in the user learning tables in respect of that action. User data can be stored in respect of a variety of different user actions or events, for example selecting, viewing, recording or searching for content.

The learned language table 34 stores data relating to audio languages of content items that have been user actioned by the user.

The PVR table 32 stores data associated with content a user has recorded on their PVR.

In the embodiment of FIG. 1 it can be understood that a large part of the user data comprises user history or user action data that represent user actions over a significant period of time. The content recommendation module 2 can use such user data during a content recommendation procedure to make content recommendations.

In various embodiments, there is a limit to how long user data is kept or used. For example in the embodiment of FIG. 1 after a threshold period, for example six months or a year after being collected, items of user data may be deleted. Thus, in some embodiments the user data for a particular user may include only relatively recent user action data, although the amount of data may still be substantial.

In the embodiment of a FIG. 1, a distinction is made between different types of user and different sets of the tables may be stored for the different types of users.

It will be understood that requests (e.g. for user data) and results may be communicated between different parts of a network using one or more application program interfaces (APIs). The API defines the parameters and other data to be included in the request and the form and format of the results from the request.

FIG. 2 is a representation of certain database learning tables stored on the hard disk storage resource 4 of the embodiment of FIG. 1. The content recommendation module 2 supports different categories of user. The tables of FIG. 2 correspond to different categories of user. The categories in this embodiment are: customer, subscriber and anonymous. Subscriber can, for example, refer to combined subscriber mode or time-slot subscriber mode. Anonymous can, for example, refer to cookie and/or session modes.

A customer may be a user who uses a service or content source. A customer profile may store one or more of the following attributes in some embodiments: preferred features; indication of preferred viewing times e.g. day, start and end times. The customer profile table also stores a list of the favorite content item group information: content source (e.g. EPG or VOD) and unique identifiers for content item groups.

A subscriber may be a person who has subscribed to a particular service rather than the individual user who is using the service. For example, the subscriber can be an account holder or an entity that represents a household. Individual users may be associated with a subscriber. There are at least two modes of operation of subscriber profiles. The first is combined mode, where data for the subscriber (for example attributes and/or subscriber actions) is stored. In that case, metadata and content recommendations, for example, may be based on attributes and/or user actions for a plurality of users associated with the same subscription, for example different members of the same household. The second is time-slot mode where content recommendations are generated in dependence on the particular time slot in question. For example user data generated for a particular time slot may be used selectively in generating metadata for a particular time slot (potentially with user data generated for other times slots being ignored or weighted to be of less significance) and/or with different rules and/or attributes being used for different time slots. For instance, there may be a rule that no adult content be recommended for morning or afternoon time slots, only for late evening or night-time time slots. Similarly, greater weighting may be given to children's programs for certain time slots, for instance late afternoon time slots, making actions associated with children's programs more likely during those time slots.

Anonymous profiles may be used to recommend content, for example, when neither the individual customer nor subscriber to a service is known. For example, for a web user who has not logged in is an anonymous user. There are two modes of operation of anonymous profiles. These are session mode (either single-session or multi-session mode) and cookie mode.

In single-session mode preferences of the anonymous consumer are stored in memory for the duration of a single session and then removed from memory at the end. In multi-session mode preferences of the anonymous consumer are kept in memory over more than one session. The anonymous profile is identified over more than one session using a unique session id stored in the anonymous profile.

In cookie mode, anonymous session tracking can be performed using cookies, wherein on a first request a cookie containing a unique identification is added and in later sessions used to identify the anonymous user. This works in a web environment. A cookie session profile holds a list of cookies that are known to the system together with data referring to when the cookie was created or last accessed by the content determination system.

For each user of all categories, the content recommendation system has separate groups of learning tables. In FIG. 2, the learning tables shown include "learned language", "content item ratings", "feature ratings" and "watched episodes". These tables are shown by way of example and other tables may be created such as "exclude content group". Other tables may also be stored in the embodiment of FIG. 1. Each user may have explicit preferences and implicit preferences. Explicit preferences are information the consumer tells the system by, for example, entering a questionnaire. Implicit preferences are information learned by the system through user actions. Data corresponding to user actions for the purpose of learning are stored in the learning tables.

The learned language table 34 stores data relating to audio languages of content items that have been user actioned by the user. For example, the table can store learned language information, the date at which the language was learned and an indication of whether or not the entry has been aged out.

The content item ratings table stores data representing properties of content such as the features, actors, channels. Feature ratings allows learn actions to specify properties of content information instead of the content item. A customer is capable of applying ratings to a content item. Rating information is stored in the customer feedback table (e.g. user profile table 30) and includes: time and date rating given; customer identifier; activity identifier; name and identifier of content item rated; content item group identifier if content item associated with a content item group; rating value; a scaled rating value to be used by the content recommendation module 2; feature ratings; content source ID; client type ID; series title of content term and content item instance identifier. A flag is also stored to indicate if a recommendation has aged out or not. A feature rating made by a customer can also be stored on a specific list of features and/or sub-genres. The watched episodes table stores data corresponding to a last actioned episode of a series as actioned by a user. For example, for each customer the episode history for the customer is stored. This includes a series identifier; a series title; a season and episode number, and the date and time the user action occurred.

The exclude content group table may store data corresponding to content explicitly excluded by the user. For example, the feedback tables also contain information on content items and content item groups that have been manually excluded by the customer. For example, for individual content items that have been excluded this information includes: identifier of the content item; content source; data and time of exclusion; series title of content item; client type ID (e.g. web, call center, set-top box). For content item groups, this information includes: customer identifier, time and date content item group excluded; content source; client type ID. In both cases, a flag is included that indicates whether or not the exclusion has been aged out.

In some embodiments, different data tables or combinations of data tables may be stored.

Although a particular system arrangement is shown in FIG. 1, there are various system arrangements that could be used.

Figure 3:
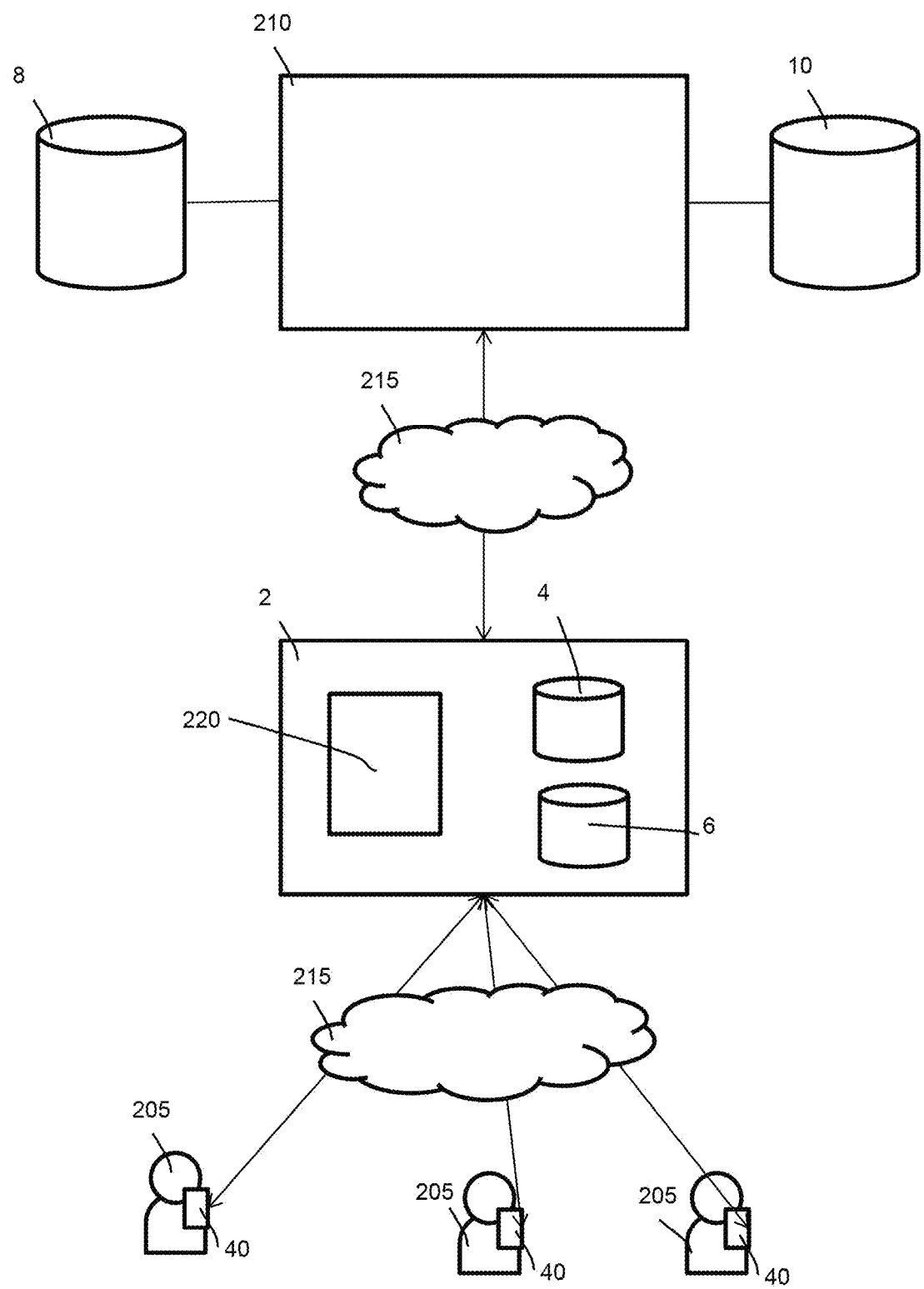
FIG. 3 is a simplified schematic of the system of FIG. 1.

FIG. 3 shows a "middleware" arrangement in which the content recommendation module 2 sits as "middleware" between users 205 and systems of a content provider 210. The content provider systems 210 are configured to provide a variety of content, e.g. real-time linear television 8 or VOD 10 to a plurality of users 205. The recommendation system 2 is implemented by processing resource 220 (which may comprise one or more processors) with the storage device 4 and user cache 6. In some examples, the content recommendation module 2 can be implemented by a cloud computing system, by one or more servers or other suitable enterprise level computing system. In this arrangement, systems that implement the content recommendation module 2 receive data sent from the user devices 40 of the users 205 that represents the user actions/user activity taken by the user 205 that are relevant to the content recommendation module 2, such as but not limited to actions taken by the user 205 to view or select content, including one or more of the user actions listed herein. The user devices 40 also provide a user ID that can be used to identify the user 205 to allow the provision of a content recommendation based on the user actions and preferences of a group of users 205. The user devices 40 communicate the data over a network, such as the cloud 215, to the content recommendation module 2. The content recommendation module 2 records the user actions in order to generate learn actions and build and update the user profiles that can be used together to make a content recommendation. The content recommendation module 2 can communicate requests and other data from the user devices 40 to the content provider systems 210 over a network, such as the cloud 215, in order to provide the content to the user devices 40.

Figure 4:
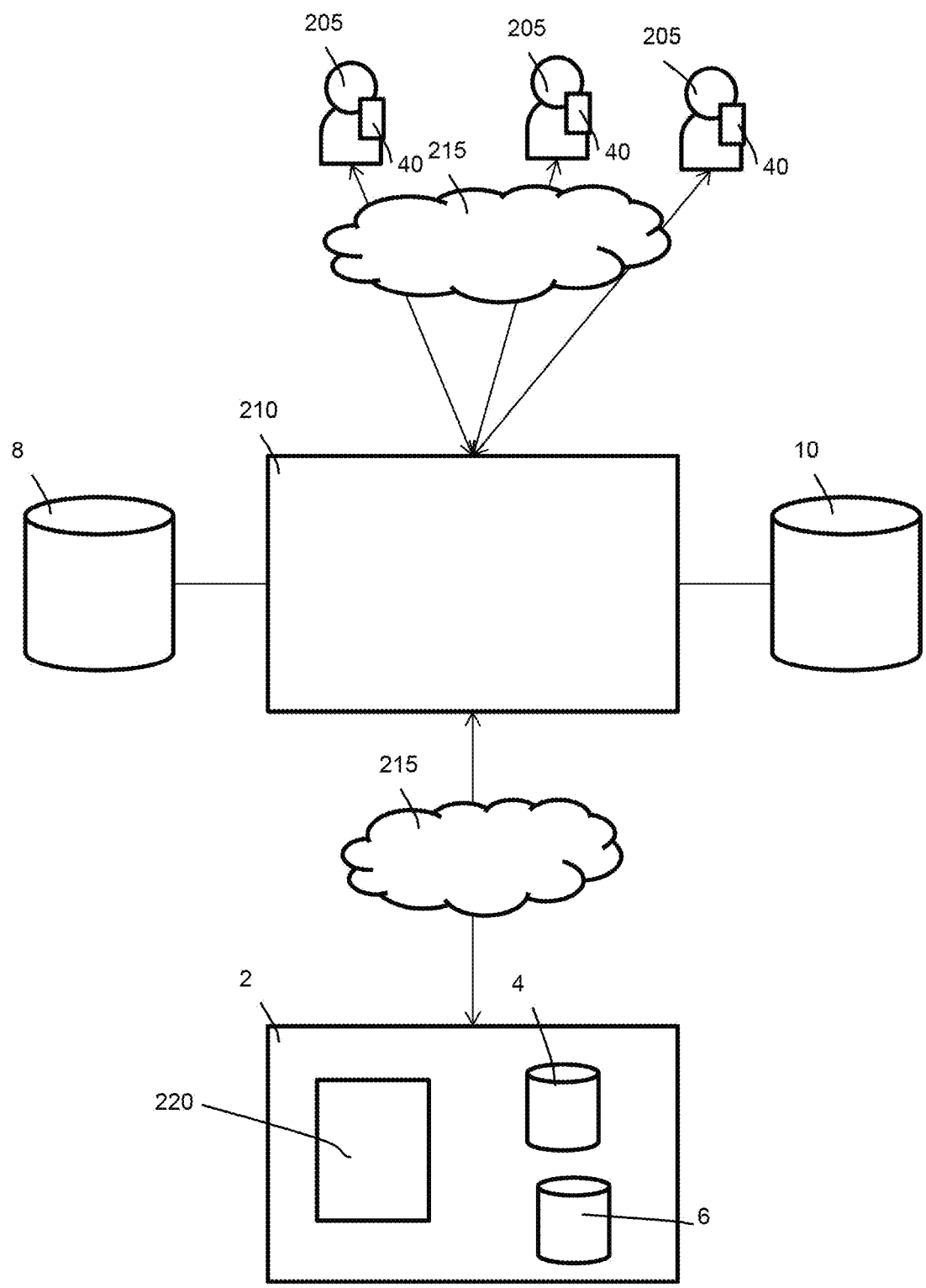
FIG. 4 is a simplified schematic of an alternative system arrangement to that of FIG. 3.

Other system arrangements that provide similar functionality to determine desirable content for a group of user are possible. FIG. 4 shows another system configuration in a "backend" processing arrangement. In this arrangement, the user devices 40 interface directly (over a network such as the cloud 215) with the systems of a content provider 210, which handles requests from and provides content to the user devices 40. User interaction data from the user devices 40 is provided by the systems of the content provider 210 to the content recommendation module 2 (e.g. over a network such as the cloud 215) in order for the content recommendation module 2 to identify learn actions and build user profiles for a plurality of users 205. The content recommendation module 2 gathers the data from the user profiles in order to determine content recommendations for the user group.

Figure 5:
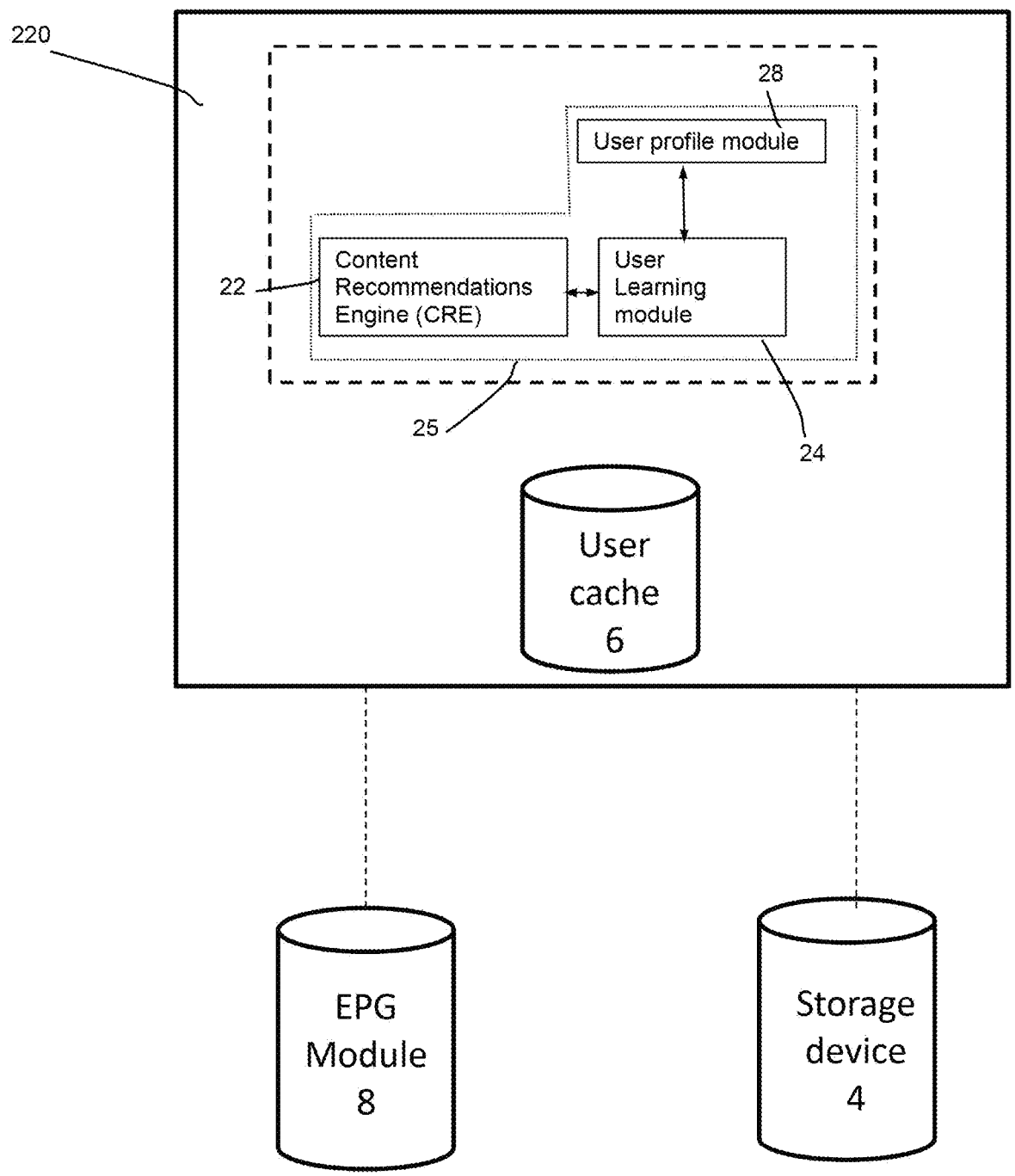
FIG. 5 is a schematic of a system for recommending content for a content distribution system.

FIG. 5 shows an arrangement of processing resource 220 for implementing the content recommendation module 2, including the user learning module 24 and the content recommendation engine (CRE) 22. In this embodiment, the user learning module 24 is part of a content recommendation system 25, which includes the content recommendation engine (CRE) 22 and a user profile module 28. However, in other embodiments, the user learning module 24 may be separated from the content determination module 2. The processing resource 220 can optionally comprise one or more processors, FPGAs, ASICS or the like, which may be provided in a single machine or distributed over a plurality of machines, and may be locally arranged or remote from each other and connected over a network. The processing resource 220 is configured to communicate with content databases, such as the EPG module 8, to retrieve content available for recommendation. The processing resource 220 comprises rapid access storage, such as user cache 6, which may be implemented in RAM or SSD storage to provide fast access to user profiles and actions that the processing resource 220 is currently, and will next be, performing operations on. The processing resource 220 is also configured to communicate with external storage such as the storage device 4 on which user actions and profiles are stored and can be retrieved into the user cache 6 when needed by the processing resource 220. The content recommendation engine (CRE) 22 can be accessed by the operatives of the content recommendation system, which may include operators of the content provider systems 210 (or other suitable users) to provide content recommendations to users. As part of this, the content recommendation engine (CRE) 22 can retrieve a seed content item identifier from user data stored in a user profile; use the seed content item identifier to generate a plurality of initial content item recommendations; sort the plurality of initial content item recommendations based on the user profile; and provide one or more of the sorted content item recommendations as personalized content item recommendations to the user device 40, as will be described in more detail below.

The above description has been provided concerning the structure of the system of FIG. 1. Operation of the system of FIG. 1 to provide a content recommendation according to one mode of operation is now described with reference to the flowchart of FIG. 6.

Figure 6:
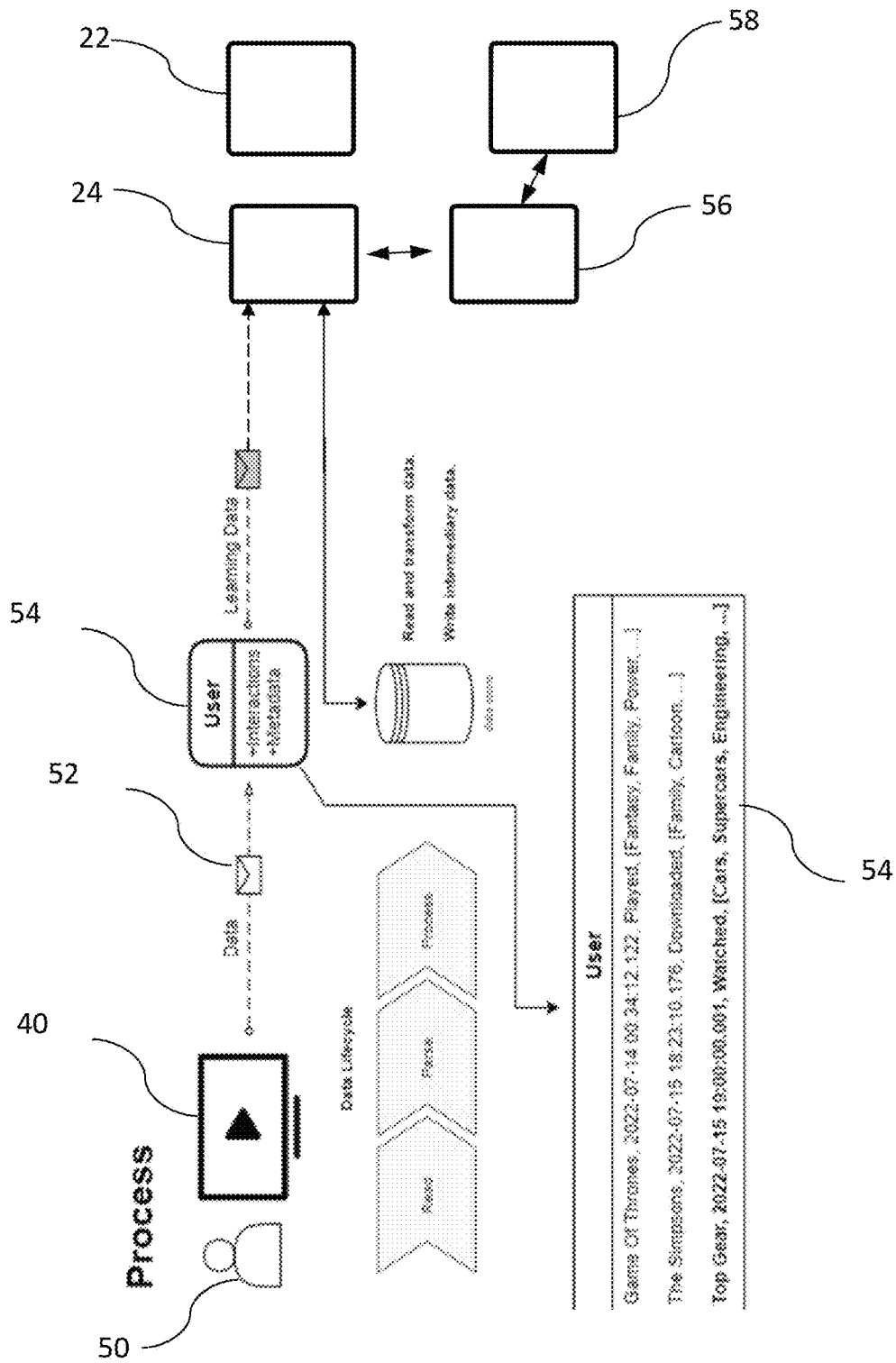
FIG. 6 is a schematic illustration of the generation of user records using the system of FIG. 1.

FIG. 6 illustrates schematically a process for generation of a content recommendation using the system of FIG. 1. Only certain components of the system of FIG. 1 are included in FIG. 6, for clarity.

FIG. 6 shows a user 50 watching a television program that they have selected on user device 40. Data 52 representing the user's activity is sent to the user learning module 24 and a learn action, as mentioned above, is performed that results in at least one user data item for that user being added to at least one of the tables. The user data item may comprise data concerning the item of content and data concerning the viewing, for example start and stop times for the viewing.

The collection of data items stored in the tables concerning the user, for instance, viewing of content by the user may be referred to as a user record or user profile for the user.

A user record 54 for the user is illustrated schematically in FIG. 6. An expanded version of at least part of the user record is also shown in FIG. 6 for purposes of illustration. In this example, the user has performed actions in relation to three items of content. In particular, the user has played an episode of Game of Thrones on 14 Jul. 2022, has downloaded an episode of The Simpsons on 15 Jul. 2022, and has just watched an episode of Top Gear on 15 Jul. 2022. Some of the metadata associated with each item of content in the record is shown in FIG. 6. For example, at least the metadata items cars, supercars and engineering are associated with the Top Gear episode. In practice there will be many more items of metadata associated with each item of content.

In general, a user record 54 will include records of far larger numbers of items of content than shown for the purposes of illustration in FIG. 6. However, such a small number of items content might be found for a new user or for a temporary user of a system. For example in some embodiments, the system may be used for a user who is a guest in a hotel or traveler in a vehicle or transport system, and it is a feature of some embodiments that user profiles can be generated even for such temporary or short-term users.

Next, user data in respect of the user 50 is sent to the user learning module 24 in order to generate or update a user profile for the user 50.

In some modes of operation, the entire user record is sent to the user learning module 24 each time the user profile for the user is to be updated, and the user profile is regenerated based on the entire user record. In other modes of operation, only changes to the user record are sent to the user learning module 24, and then the user profile for the user is retrieved and updated based only on the changes to the user record (for example based on the user having watched one or more new items of content).

In the example shown in FIG. 6, for simplicity for the purposes of illustration, the user record sent to the user learning module 24 consists only of the record for the latest item of content viewed, in this case Top Gear.

In this example, the user record includes the metadata items 'cars', 'supercars', 'engineering' and 'talk-show'.

The user learning module 24 in this embodiment then performs a search of various data sources 56, for example in the cloud, to determine any other information concerning the item of content. For example, various databases can be consulted that include additional information concerning television programs or other items of content.

In the present embodiment, the record for the item of content and any other information found from the search of data sources 56 is subject to processing by sub-module 58 that matches the metadata and other information for the item of content to an ontology of metadata terms that are maintained by the system. Thus, the metadata for the item of content can be enriched, corrected or supplemented.

In some embodiments, the metadata includes features or properties of the item of content and a weighting for the importance of the feature in the item of content. For example, the metadata may comprise the name of an actor in the item of content and the weighting may represent the importance of the actor in the item of content—for example a high weighting would be given to a lead actor while a low weighting would be given to an actor playing a minor role. In another example, the metadata may comprise a mood (e.g.

happy, sad, dark, spooky) associated with the item of content and the weighting may represent the dominance of the mood in the item of content.

In the present embodiment the ontology consists of around 38,000 terms that can be used as metadata to represent items of content, for deep content understanding. Any other suitable ontology can be used in other embodiments. In some embodiments, no ontology is used and the raw metadata associated with the item of content (for example, provided by the content maker, distributor or broadcaster) is used without amendment or enrichment.

The metadata (and optionally its weighting) for the item of content is stored in the user record in the hard disk storage 4.

When a content recommendation session is required, for example, when a request to provide content recommendations for a user group is received by the content recommendation module 2 from an operator device (e.g. on initialization of a user session), the content recommendation engine (CRE) 22 retrieves as inputs, for example, via the user cache 6, the user profile (or at least some of the information in the user profile) from the storage device 4 and the metadata associated with available content from, for example, the EPG module 8.

The content recommendation engine (CRE) 22 then uses these inputs to retrieve a seed content item identifier from user data stored in the user profile; use the seed content item identifier to generate a plurality of initial content item recommendations from the available content; sort the plurality of initial content item recommendations based on the user profile; and provide one or more of the sorted content item recommendations as personalized content item recommendations to the user device 40. These steps may be performed in a number of ways.

The content recommendation engine (CRE) 22 may be comprised of one or more components, functional elements or procedures to carry out the above steps. In a non-limiting example, the content recommendation engine (CRE) 22 may comprise a trained machine learning model, which is trained to take as inputs the weighting of the metadata for the seed content item, along with the metadata associated with the available content and to generate an output listing the best matching available content based on the metadata. The best matching available content may comprise a single item of content or, for example, tens or hundreds of items of the best matching available content constituting the initial content item recommendations. This initial output may be relayed to another component, functional element or procedure for sorting based on the user profile.

The sorting may comprise obtaining metadata representing at least some properties of content associated with the content item identifiers in the user profile; comparing the metadata from the user profile with metadata associated with the initial content item recommendations; and ordering the initial content item recommendations from most closely matching to least closely matching.

In the present embodiment, a thresholding (e.g. filtering) process is performed on the sorted list such that content recommendations with a low match to the user profile are omitted from being provided to the requesting operating device. For example, 50 closely matching items may be returned in the list of initial content item recommendations and these may be sorted according to user preferences stored in the user profile (e.g. to identify the items having similar weights and features that are most likely to be preferred by the user). The sorted list may then be filtered to return, for example, the top ten results as the personalized content item recommendations. In some cases only the top result may be presented to the user.

In some embodiments, the one or more personalized content item recommendations may be filtered based on popularity (e.g. among a user group), prior to providing the one or more personalized content item recommendations to the user device. This ensures that any very close matches that are obscure (i.e. very old content) are filtered out and only non-obscure results are provided.

In some embodiments, the method may comprise filtering the initial content item recommendations based on popularity, prior to sorting the plurality of initial content item recommendations.

Any suitable trained machine learning model or other model may be used. For example, a clustering model may be used which may comprise a Kohenen neural network or KMeans clustering technique to cluster the content into distinct groups, which are unknown to begin with.

In some embodiments, the trained model or other process is applied directly to the metadata without also enriching or mapping to or otherwise using the ontology. In some embodiments more than one trained model is used, for example one or more trained models to enrich or modify metadata associated with potential items of content based on the ontology or other further data set, and one or more models to determine the content recommendations based on user profiles.

In some embodiments, the model may assign scores to each of the items of available content based on how closely the content metadata matches that of the seed content item.

This approach allows for a more accurate and effective technique for identifying and recommending content to individual uses that they may like. As such, users will be presented with content recommendations that they are likely to enjoy.

Figure 7:
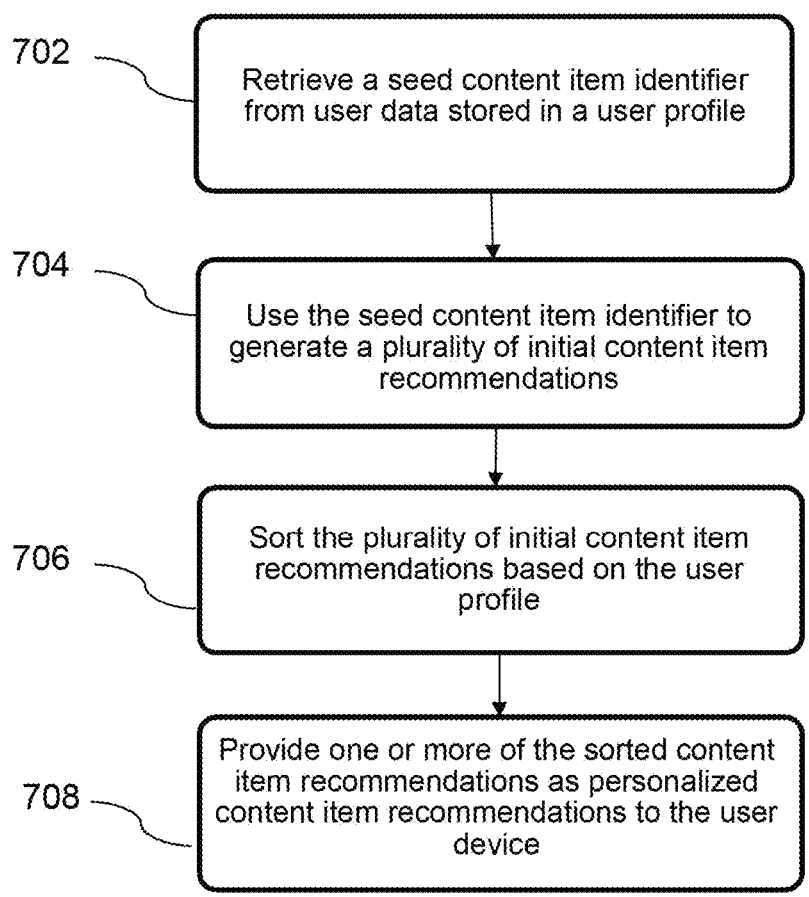
FIG. 7 is an overview of a method of recommending content for a content distribution system in accordance with an embodiment.

FIG. 7 is an overview of a method for providing, to a user device configured for providing content to a user, one or more personalized content item recommendations, in accordance with an embodiment.

In general, the method comprises, retrieving a seed content item identifier from user data stored in a user profile in a step 702. Using the seed content item identifier to generate a plurality of initial content item recommendations in a step 704. Sorting the plurality of initial content item recommendations based on the user profile in a step 706 and providing one or more of the sorted content item recommendations as personalized content item recommendations to the user device in a step 708.

The method may be stored on a non-transitory computer-readable medium as computer-readable instructions that a processing circuitry can execute.

The user data may comprise content item identifiers for content flagged as a result of a user action and the seed content item identifier may be selected from the content item identifiers.

The method may further comprise monitoring user activity including identifying content that the user of the user device has interacted with and adding content item identifiers, for the identified content, to the user data. The monitoring user activity includes monitoring user actions by the user of the user device 40, wherein the user actions may comprise one or more of: selecting, viewing, recording, purchasing, reading, listening to, playing, sharing, content rating, commenting on, downloading, watching, bookmarking, browsing, adding to a shopping basket, watching or listening to a trailer, clicking on a search result, remotely recording, setting a reminder, liking, disliking, tweeting, posting on social media, playing purchased content, stopping watching, stopping playing or otherwise interacting with content.

A learn action may be based on an indication that a user has watched a content item for a specified period of time. The information may be used as an indication of user preferences and potentially to provide more accurate recommendations for content in the future. A minimum event time filter may be implemented to ensure that short period events are not sent to the user learn module 24. In this case, a learn action is only generated if an event exceeds the minimum event time filter. In addition, there may be a rule that only one learn action for each content item should be generated. For example, a viewer may watch a program and switch channels during an advert break and then return to the original program. In such an event, only one learn action may be generated according to some embodiments.

New user data, for example new table entries, corresponding to the learn actions for the user ultimately are stored in the hard disk storage 4. However, it is a feature of some embodiments that user data for the user stored in RAM 7 during a content recommendation session is updated, based on the learn actions for the user occurring during the content recommendation session, on an ongoing basis. Thus, the user data for a user stored in RAM 7 may change during a content recommendation session, such that the content recommendations are based on the most up-to-date user data.

In the present embodiment, the user data for a user is overwritten by the user data stored in RAM 7 (which may be more up-to-date) in response to the end of a content recommendation session. For example, the updated user data can be provided to the hard disk resource 4 in response to an expiry event. For example, an expiry event may occur a pre-determined period of time after a start of a content recommendation session.

In some embodiments, all of the user data for the users stored in the hard disk storage 4 may be overwritten by the user data stored in RAM 7. Alternatively, only changes to the user data may be written from RAM 7 to the hard disk storage 4. In some embodiments user data is written to the hard disk storage 4 periodically or in response to at least one of processing capacity or communication capacity being available. Higher priority may be given to updating the user data in RAM 7 than to updating the user data in the hard disk storage 4.

In some embodiments, the user data for a user may be maintained in RAM 7 after the end of a content recommendation session and only deleted from RAM 7 in response to the user data from RAM 7 having been written to the hard disk storage 4.

Details of the user activity and at least a content identifier for the content interacted with are stored in the user profile on the hard disk storage 4. The content identifier is used to obtain metadata associated with the content. The metadata may be stored on a content database accessible by the user learning module 24. The metadata may be obtained either on detection of a user activity concerning the content or at a time thereafter. For example, the user learning module 24 may be configured to obtain metadata for a plurality of content identifiers during a scheduled batch run or when the metadata for a particular content item is required. For example, when a content recommendation procedure is initiated (by a request or scheduled procedure), the user learning module 24 may be instructed to obtain metadata for a plurality of content identifiers stored in a plurality of user profiles.

The metadata may comprise data relating to one or more of: actor; audience; award; category; character; character type; concept source; director; format; franchise; host; milieu; mood; producer; person; singer; subcategory; scenario; setting; sports competition; studio; style; subject; team; theme; time period; and writer or other property associated with content. The metadata may comprise a weighting of an importance of each property in the associated items of content.

In some embodiments, the metadata associated with the identified items of content may be stored in the user profiles, for example in the metadata table 42 on the hard disk storage 4, which is remote from the user devices 40.

The method may further comprise obtaining and/or generating the (enhanced) metadata associated with the available content. In this case, the system may create and/or maintain one or more databases of metadata associated with the available content, which may be accessible via the EPG module 8, for example. In some embodiments, the metadata associated with the available content may be stored in RAM 7. The content metadata stored in RAM 7 may be updated periodically or in response to changes in the data stored. By caching the content metadata in RAM processing and data access speed may be increased.

As a first stage of the process, a user initializes a viewing session through a first initiation event. An initiation event can, for example, be a user logging on to a service provider or turning on the user device 40. The initiation event is communicated to the content recommendation module 2 via a communication channel between the user device 40, for example a set top box or other device, for example at the user's home or other remote location, and the content recommendation module 2. In the embodiment of FIG. 1 there is direct communication between the user device 40 and the content recommendation module 2. In alternative embodiments, communication between the user device 40 and the content recommendation module 2 is mediated or passes through, for example a content provider, for instance a TV system operator to which the user subscribes, as illustrated in FIG. 4.

In response to the initiation event, the user is then presented, via a display of the user device 40, with a content selection screen displayed on a display screen and/or user interface, which presents the user with a choice of viewing different content items from the content source. For an EPG content source 8, the content selection screen may form part of the EPG itself. For a VoD content source 10, a dedicated user interface may be presented. It is a feature of the embodiment of FIG. 1 that the choice of content items includes content recommendations generated by the content recommendation system of FIG. 1 and communicated to the user device. In one mode of operation it is a requirement that the content recommendations should be provided almost instantaneously, for example within a few hundred milliseconds, so that they can be included on the user interface together with other available items of content, for example live TV schedules, as soon as the user interface is displayed to the user.

In the present embodiment, the initiation event is treated automatically by the content recommendations module as being a request for recommendations for the user.

In response to the initiation event a start time to the viewing session is logged by the CRE 22, for example, to coincide with the initiation event, a content recommendation session is opened and user data, associated with the user, are retrieved from storage on tables in the hard disk storage resource 4 and loaded to the user cache 6 in RAM 7. The user data are maintained in RAM 7 throughout the content recommendation session.

The CRE 22 also maintains content data in the RAM 7, for example any suitable data relating to properties of the content, such as metadata obtained from the EPG module 8 and the VoD module 10. The content data stored in RAM 7 may be updated periodically or in response to changes in the data stored, for example, at the EPG module 8 and VoD module 10. By caching the content data in RAM processing and data access speed may be increased.

Following retrieval of user data and obtaining content source information, the CRE 22 is configured to use the user data located in the user cache 6 together with the available content information to generate one or more personalized content item recommendations for the user. Any suitable content recommendation process may be used to generate the initial content item recommendations based on the seed content item, for example based on a weighting, scoring and/or matching process generated based on previous user actions, and matching to available content. The content recommendation process may be at any desired level of simplicity, complexity or sophistication. In a simple example, if it is determined from the user data that a user has previously watched movies starring a particular actor, or watched football matches featuring a particular team, then the CRE 22 may produce a recommendation for the user to watch a movie or other content featuring that actor, or a program concerning that football team, if such movie, program or other content is currently available or will soon be available via the available content sources. It will be understood that the content recommendation process can be more sophisticated and, may be for example based on similarities or cross-correlations between different content parameters and user actions and properties based on large amounts of historical data. Any suitable content recommendation process may be used.

Once the CRE 22 has performed the content recommendation process, the content recommendation(s) generated by the CRE 22 are then transmitted to the user device 40 either directly or indirectly. In some embodiments the content recommendation(s) are transmitted to a database, server or other device, for example a third party device. The content recommendation(s) may be further processed and/or may be transmitted onward to then user device either immediately, at a later time or upon request. The content recommendation(s) may be transmitted in any suitable fashion either to the user device, or to the database, server or other device.

In the present embodiment, software installed at the user device determines whether or how the content item recommendation are displayed on the user interface.

The selecting the seed content item identifier may be based on one or more of: a recency of a user action associated with a content item identifier in the user profile; a time of day of a user action associated with a content item identifier in the user profile; a day of the week of a user action associated with a content item identifier in the user profile; a number of user actions associated with a same content item identifier in the user profile; a number of user actions associated with similar or related content item identifiers in the user profile; a type of user action associated with a content item identifier in the user profile; and a popularity among a group of users, of a content item identifier in the user profile. For example, if a user watches different episodes of the same show, the show may be selected as the seed item for the personalized content recommendation process.

The system may provide recommendations based on any user actions or interactions with content. However, in some embodiments, the system may be configured to base recommendations on a specific user action, for example, because you watched X, because you recorded Y, because you purchased Z, etc. and this information can be used in the user interface, for example, as the name of a content rail in an EPG.

Notably, the seed content item provides a trusted started point for recommending other content the user may like. However, unlike traditional recommendation techniques, the results of the present method are personalized based on general user preferences from the user profile, which bias the results to present the best matches for each individual user first.

In some embodiments, the seed content item identifier may be used to generate a plurality of initial content item recommendations by obtaining metadata associated with the seed content item identified by the seed content item identifier; and identifying related content comprising content associated with one or more of the same or similar metadata.

In some embodiments, the seed content item identifier may be used to generate a plurality of initial content item recommendations by identifying other users that have viewed the seed content item identified by the seed content item identifier; and identifying collaborative content comprising content viewed by said other users.

The providing one or more of the personalized content item recommendations to the user device may comprise instructing the user device to display the one or more personalized content item recommendations for selection by the user.

The user profile may be stored in a first memory resource remote from the user device, the first memory resource storing user profiles for a plurality of users of a content distribution system; and the content may be stored in a second memory resource remote from the first memory resource, the second memory resource storing items of content for the content distribution system.

The content (e.g. the content that the user interacts with and/or the available content) may comprise one or more of: television content; video content, audio content, visual content, computer games, printed content, text-based content, live performances, movies, TV programs, music, podcasts, talking books, computer games, books, magazines, news, recipes, concerts, plays, comedy performances, entertainment or sporting events.

The metadata associated with content items may include constant information including: a unique identifier; duration of the content item; the certificate of the content item e.g. the age rating; the year the content item was released; the critic rating for the content item; the original audio language for the content item; the season and episode numbers; series title information and/or identifier; content item description, and a primary language to be used by a content recommendations engine when checking for previously recommended items. The primary language may or may not be the same as the original audio language. For multi-language content items, translations of the title and description can be stored. Furthermore, available broadcast language information can be stored and an indicator to indicate the type of language available. For example, the language may be primary audio language, dubbed audio, subtitled and/or signed.

Further information stored for content items includes: genre and sub-genre information and names associated with the content item. A given name can be associated with, for example, an actor or director involved with or appearing in the content item. For a given name associated with the content item, an identifier for the role in the content item is also stored. In addition, an indicator of the rank of importance of the name and/or the role in the content item may be stored. The rank may be high for a more important role in the content item. For example, a given actor playing a leading part would be assigned the highest rank available.

In the present embodiment recommendations of items of content may be provided based on data concerning items of content of the same type (for example video content, such as movies, TV programs or other video content), and/or based on user data representing previous consumption of, or actions relating to, content of the same type (for example video content, such as movies, TV programs or other video content). It will be understood that video content may include associated audio content, for example an associated soundtrack.

In other embodiments, content recommendations are generated for content items of one type based on content information or user actions concerning content of another type. The different types of content may comprise, but are not limited, to video content (for example, movies, TV programs or other video content), audio content (for example, music, podcasts, talking books), computer games, books, magazines, other printed content, live performances such as concerts, plays, comedy performances or sporting events.

In some embodiments, the content recommendations based on user actions or preferences concerning content of one type may comprise recommendations of more than one type of desirable content. For example, the seed content item may be selected based on user actions or preferences in relation to TV programs, but the content recommendations may comprise one or more TV programs and, in addition, one or more items of another type of content.

Although the system of the present embodiment includes hard disk storage 4 and RAM 7, any suitable other memory devices or types of storage may be used as well as or instead of the hard disk storage 4 and/or RAM 7 in other embodiments.

An important technical consideration concerns the amount of data that the system and method need to contend with. For example, there may be 50 million users and user profiles associated with a given content provider, billions of content items and billions of data points (e.g. relating to the metadata). Accordingly, the system must be configured to handle such huge volumes of data in an efficient and yet accurate manner in order to provide useful results.

As with the content recommendation made in response to the initiation of the user session, there may be significant constraints on how quickly any subsequent content recommendation should be provided. For example, there may be requirement that the content recommendation is provided within 200 ms or 300 ms, or within any other time period that would enable the content recommendation to be displayed simultaneously with, overlaid on or forming part of the new EPG screen when the new EPG screen is first displayed. In some embodiments the user device 40 may be configured not to display the content recommendation if it is not received within a threshold time, for example within 30 s, 10 s, 5 s or 1 s by way of example, and for example to proceed with display of the EPG screen without the content recommendation. Any other suitable display output may be used as well as or instead of an EPG screen in alternative embodiments, for example a window or a selected portion of a screen or window.

It can be understood that the time constraints on providing content recommendations can be significant, given that personalized content recommendations may need to be generated on the fly, particularly as it may be necessary to provide personalized content recommendations for tens of thousands, hundreds of thousands, or even millions of users substantially simultaneously in the case of systems with large numbers of users and during busy periods such as peak viewing periods.

It will be understood that the CRE 22 may maintain content recommendation sessions for a plurality of the users and may maintain in the RAM 7 user data for said plurality of the users substantially simultaneously. For example, user data may be maintained in the RAM 7 for thousands, hundreds of thousands or even millions of users substantially simultaneously, depending on the RAM 7 storage capacity available and the number of subscribers or other users associated with the system.

As described herein, the system and method of the present disclosure can be used advantageously to provide personalized content recommendations to a user in real-time. Advantageously, the content recommendations can be personalized without losing the best related content matches for the seed content item.

The above description of specific embodiments is made by way of example only. A skilled person will appreciate that variations of the described embodiments may be made without departing from the scope of the invention.

The invention claimed is:

1. A computer-implemented method for providing, to a user device configured for providing content to a user, one or more personalized content item recommendations, comprising:
 retrieving a seed content item identifier from user data stored in a user profile, wherein when a user selects a program or other item of content and views or otherwise consumes it for greater than a threshold period of time, a learn action is generated and at least one user data item for that user is stored in the user profile;
 using the seed content item identifier to generate a plurality of initial content item recommendations;
 sorting the plurality of initial content item recommendations based on the user profile;
 providing one or more sorted content item recommendations as personalized content item recommendations to the user device; and
 filtering the one or more personalized content item recommendations based on popularity, prior to providing the one or more personalized content item recommendations to the user device.

2. The computer-implemented method of claim 1 wherein the user data comprises content item identifiers for content flagged as a result of a user action and the seed content item identifier is selected from said content item identifiers.

3. The computer-implemented method of claim 2 wherein sorting the plurality of initial content item recommendations based on the user profile comprises:
 obtaining metadata representing at least some properties of content associated with the content item identifiers in the user profile;
 comparing the metadata from the user profile with metadata associated with the initial content item recommendations; and
 ordering the initial content item recommendations from most closely matching to least closely matching.

4. The computer-implemented method of claim 3 wherein the metadata comprises a weighting of an importance of each property in relation to the content.

5. The computer-implemented method of claim 1 further comprising filtering the initial content item recommendations based on popularity, prior to sorting the plurality of initial content item recommendations.

6. The computer-implemented method of claim 1 wherein the user action comprises one or more of: selecting, viewing, recording, purchasing, reading, listening to, playing, sharing, content rating, commenting on, downloading, watching, bookmarking, browsing, adding to a shopping basket, watching or listening to a trailer, clicking on a search result, remotely recording, setting a reminder, liking, disliking, tweeting, posting on social media, playing purchased content, stopping watching, stopping playing or otherwise interacting with content.

7. The computer-implemented method of claim 1 wherein using the seed content item identifier to generate a plurality of initial content item recommendations comprises:
obtaining metadata associated with a seed content item identified by the seed content item identifier; and
identifying related content comprising content associated with one or more of the same or similar metadata.

8. The computer-implemented method of claim 1 wherein using the seed content item identifier to generate a plurality of initial content item recommendations comprises:
identifying other users that have viewed the seed content item identified by the seed content item identifier; and
identifying collaborative content comprising content viewed by said other users.

9. The computer-implemented method of claim 1 wherein providing one or more of the personalized content item recommendations to the user device comprises instructing the user device to display the one or more personalized content item recommendations for selection by the user.

10. The computer-implemented method of claim 1 further comprising monitoring user activity including identifying content that the user of the user device has interacted with and adding content item identifiers, for the identified content, to the user data.

11. The computer-implemented method of claim 1 further comprising selecting the seed content item identifier based on one or more of: a recency of a user action associated with a content item identifier in the user profile; a time of day of a user action associated with a content item identifier in the user profile; a day of a week of a user action associated with a content item identifier in the user profile; a number of user actions associated with a same content item identifier in the user profile; a number of user actions associated with similar or related content item identifiers in the user profile; a type of user action associated with a content item identifier in the user profile; and a popularity among a group of users, of a content item identifier in the user profile.

12. The computer-implemented method of claim 1 wherein the content comprises one or more of: television content; video content, audio content, visual content, computer games, printed content, text-based content, live performances, movies, TV programs, music, podcasts, talking books, computer games, books, magazines, news, recipes, concerts, plays, comedy performances, entertainment or sporting events.

13. The computer-implemented method of claim 1 wherein the user profile is stored in a first memory resource remote from the user device, the first memory resource storing user profiles for a plurality of users of a content distribution system; and the content is stored in a second memory resource remote from the first memory resource, the second memory resource storing items of content for the content distribution system.

14. The computer-implemented method of claim 2 wherein the metadata comprises data relating to one or more of: actor; audience; award; category; character; character type; concept source; director; format; franchise; host; milieu; mood; producer; person; singer; subcategory; scenario; setting; sports competition; studio; style; subject; team; theme; time period; and writer.

15. A system for providing, to a user device configured for providing content to a user, one or more personalized content item recommendations, the system comprising processing circuitry configured to:
retrieve a seed content item identifier from user data stored in a user profile, wherein when a user selects a program or other item of content and views or otherwise consumes it for greater than a threshold period of time, a learn action is generated and at least one user data item for that user is stored in the user profile;
use the seed content item identifier to generate a plurality of initial content item recommendations;
sort the plurality of initial content item recommendations based on the user profile;
provide one or more sorted content item recommendations as personalized content item recommendations to the user device; and
filter the one or more personalized content item recommendations based on popularity, prior to providing the one or more personalized content item recommendations to the user device.

16. A non-transitory computer-readable medium that comprises computer-readable instructions that are executable to perform a method for providing, to a user device configured for providing content to a user, one or more personalized content item recommendations, comprising:
retrieving a seed content item identifier from user data stored in a user profile, wherein when a user selects a program or other item of content and views or otherwise consumes it for greater than a threshold period of time, a learn action is generated and at least one user data item for that user is stored in the user profile;
using the seed content item identifier to generate a plurality of initial content item recommendations;
sorting the plurality of initial content item recommendations based on the user profile;
providing one or more sorted content item recommendations as personalized content item recommendations to the user device; and
filtering the one or more personalized content item recommendations based on popularity, prior to providing the one or more personalized content item recommendations to the user device.

* * * * *